(12) United States Patent
Fukawatase et al.

(10) Patent No.: US 7,922,197 B2
(45) Date of Patent: Apr. 12, 2011

(54) VEHICLE AIRBAG DEVICE

(75) Inventors: Osamu Fukawatase, Aichi-ken (JP); Shuji Yamada, Aichi-ken (JP); Akiyoshi Sanada, Aichen-ken (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 176 days.

(21) Appl. No.: 12/389,816

(22) Filed: Feb. 20, 2009

(65) Prior Publication Data

US 2009/0224519 A1 Sep. 10, 2009

(30) Foreign Application Priority Data

Feb. 22, 2008 (JP) ................. 2008-041834

(51) Int. Cl.
*B60R 21/239* (2006.01)
(52) U.S. Cl. ..................... 280/739; 280/743.2
(58) Field of Classification Search .................. 280/739, 280/743.2
See application file for complete search history.

(56) References Cited

U.S. PATENT DOCUMENTS

| | | | |
|---|---|---|---|
| 6,419,267 B1 | 7/2002 | Hashimoto et al. | |
| 2005/0225065 A1* | 10/2005 | Fujll | 280/743.2 |
| 2005/0236822 A1* | 10/2005 | Rose et al. | 280/739 |
| 2006/0151979 A1* | 7/2006 | DePottey et al. | 280/739 |
| 2008/0073891 A1* | 3/2008 | Rose et al. | 280/739 |
| 2009/0020991 A1* | 1/2009 | Abe et al. | 280/739 |
| 2009/0039630 A1* | 2/2009 | Schneider et al. | 280/740 |

FOREIGN PATENT DOCUMENTS

| | | | |
|---|---|---|---|
| JP | 2000-142307 | * | 5/2000 |
| JP | 2000289560 | | 10/2000 |
| JP | 2001-151059 A | * | 6/2001 |
| JP | 2001151059 | | 6/2001 |
| JP | 2002002439 | | 1/2002 |
| JP | 2002079905 | | 3/2002 |

* cited by examiner

*Primary Examiner* — Ruth Ilan
(74) *Attorney, Agent, or Firm* — Gifford, Krass, Sprinkle, Anderson & Citkowski, P.C.

(57) ABSTRACT

A vehicle airbag device includes: an airbag which is housed in a folded state when a gas generation portion is not activated, and which inflates and deploys by receiving gas when the gas generation portion is activated, and whose two side portions are provided with gas outlet vent holes; and a tether that includes pair of left and right side portions extending along internal side surfaces of the two side portions of the airbag, and an intermediate portion interconnecting occupant-side end portions of the pair of left and right side portions. The airbag devices closes the vent holes by moving the pair of left and right side portions relative to the internal side surfaces of the two side portions of the airbag when the pressing force on the intermediate portion of the tether is greater than or equal to a predetermined value.

19 Claims, 7 Drawing Sheets

VEHICLE AIRBAG DEVICE

INCORPORATION BY REFERENCE

The disclosure of Japanese Patent Application No. 2008-041834 filed on Feb. 22, 2008 including the specification, drawings and abstract is incorporated herein by reference in its entirety.

BACKGROUND OF THE INVENTION

1. Field of the Invention

The invention relates to a vehicle airbag device in which an airbag is provided with a vent hole.

2. Description of the Related Art

Japanese Patent Application Publication No. 2002-2439 (JP-A-2002-2439) discloses a structure that mechanically controls the opening and closing of vent holes formed in an airbag corresponding to whether or not an occupant is wearing webbing. This related technology will be briefly described. That is, in an airbag device for a passenger seat, vent holes are formed at three locations in the airbag, concretely, the left and right side surfaces and an upper surface of the airbag. Incidentally, the upper surface of the airbag substantially faces the windshield pane.

According to the foregoing construction, in the case where an occupant is wearing webbing at the time of a frontal collision, the occupant is restrained by the webbing, so that the occupant's head moves forward and obliquely downward relative to the vehicle, by inertia. Then, the occupant's upper body that includes the head is received by the airbag. In this case, the upper surface of the airbag does not contact the windshield pane, so that the gas is let out from the three vent holes, and thus the bag internal pressure is appropriately lowered. On the other hand, in the case where an occupant is not wearing the webbing, since the occupant is not restricted by the webbing, the occupant's head moves to a vehicle front side by inertia at the time of a frontal collision. Therefore, the airbag is immediately pressed to the vehicle front side, so that the upper surface of the airbag strongly contacts the windshield pane. Thus, the vent hole provided in the upper surface is closed, so that the bag internal pressure heightens.

However, according to the construction disclosed in the foregoing related technology, the vent hole additionally provided in a central portion of the upper surface of the airbag is closed by the windshield pane, and therefore there is a problem as follows. For example, when a vehicle undergoes a frontal collision at a obliquely front side (undergoes an oblique collision), the occupant's head moves to an obliquely front side of the vehicle by inertia. Hence, the occupant's head is received by an end portion of the airbag in the width direction of the vehicle. In this case, it is conceivable that the airbag is pushed in a vehicle width direction in a plan view so that the vent hole may open.

Besides, since the foregoing airbag is constructed so that the vent hole formed at the center of the upper surface of the airbag is closed from outside the airbag by utilizing the windshield pane, there is a possibility that a gap may form between the vent hole and the windshield pane so that the vent hole cannot be closed, depending on the curved surface shape of the windshield pane, or the curved surface shape of the upper surface of the airbag at the time of inflation and deployment.

SUMMARY OF THE INVENTION

It is an object of the invention to provide a vehicle airbag device which opens and closes a vent hole by using a tether, and which is able to efficiently protect an occupant, particularly, an occupant's head, regardless of whether or not the occupant is wearing webbing, and which secures the occupant's head protection performance even in the case of an oblique collision, and which is less subject to external factors such as surrounding configurations and the like.

A vehicle airbag device in accordance with a first aspect of the invention includes: a gas generation portion that generates gas when activated; an airbag which is housed in a folded state when the gas generation portion is not activated, and which inflates and deploys by receiving supply of a gas when the gas generation portion is activated, and whose two side portions are provided with vent holes for letting out the gas; a tether that includes pair of left and right side portions whose base end portions are fixed to a gas generation portion side or a side of the airbag opposite to an occupant side, and which extend along internal side surfaces of the two side portions of the airbag, and an intermediate portion that interconnects occupant-side end portions of the pair of left and right side portions in an airbag transverse direction and that is disposed facing an occupant-side end portion of the airbag; and a vent hole opening-closing control portion that maintains an open state of the vent holes when a pressing force that acts on the intermediate portion of the tether is less than a predetermined value, and that closes the vent holes by moving the pair of left and right side portions relative to the internal side surfaces of the two side portions of the airbag when the pressing force on the intermediate portion of the tether is greater than or equal to the predetermined value.

According to the first aspect of the invention, when a collision occurs, the gas generation portion is activated to generate gas. The generated gas is supplied into the airbag that is housed in the folded state. Therefore, the airbag is inflated and deployed to the occupant side, so that the airbag receives the occupant's upper body that includes the head and that is moving by inertia. When the occupant's upper body that includes the head contacts the inflated airbag, the internal pressure of the airbag heightens but gas is let out through the vent holes that are formed in the two side portions of the airbag, so that the internal pressure of the airbag is appropriately kept.

More concretely, in the case where an occupant is wearing the webbing, since the webbing restrains the inertia movement of the occupant's upper body that includes the head to a vehicle front side, the occupant's head moves forward and obliquely downward relative to the vehicle by inertia, so that the amount of advancement of the occupant's head into the airbag becomes small. Therefore, the pressing force that acts on the intermediate portion of the tether disposed in the airbag becomes less than a predetermined value (including the case where the intermediate portion of the tether is not pressed at all), so that an open state of the vent holes formed in the two side portions of the airbag is maintained by the vent hole opening-closing control portion. Hence, since gas is let out from inside the airbag through the vent holes, the internal pressure of the airbag is appropriately kept.

On the other hand, in the case of an occupant not wearing the webbing, since the webbing does not restrain the inertia movement of the occupant's upper body that includes the head to the vehicle forward side, the occupant's head moves to the vehicle forward side by inertia immediately upon a collision. Therefore, the amount of the occupant's head into the airbag becomes large, so that the pressing force (tension) that acts on the intermediate portion of the tether disposed in the airbag becomes greater than or equal to a predetermined value. Therefore, due to the vent hole opening-closing control portion, the pair of left and right side portions of the tether are moved relative to the internal side surfaces of the two side portions of the airbag so as to close the vent holes. Hence, the internal pressure of the airbag is maintained at a high level, so that the occupant's upper body that includes the head is appropriately restrained.

Furthermore, in the foregoing aspect of the invention, if the vehicle undergoes an obliquely front side collision in the case where an occupant is not wearing the webbing, the movement locus of the occupant's head is caused to be a locus extending obliquely forward relative to the vehicle as well. However, since the intermediate portion of the tether interconnects the occupant-side end portions of the pair of left and right side portions in the airbag transverse direction, and is disposed facing the occupant-side end portion of the airbag, a relatively large pressing force by the occupant's head acts on a site in the intermediate portion of the tether even when the inertia movement direction of the occupant's head deviates from a forward direction to an obliquely forward direction relative to the vehicle. Therefore, in the case of an oblique collision, too, the pair of left and right side portions of the tether move relative to the internal side surfaces of the two side portions of the airbag, so that the vent holes are closed.

Moreover, unlike the foregoing related technology, the construction of the foregoing aspect of the invention is not a construction that closes a vent hole formed in the airbag by using a member provided outside the airbag, but a construction in which the vent holes are closed by using the tether that is disposed within the airbag. Therefore, this aspect of the invention is not subject to an external factor, such as a surrounding configuration or the like, for example, the shape of the windshield pane or the like.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

First Embodiment

A first embodiment of a vehicle airbag device in accordance with the invention will be described hereinafter with reference to FIGS. 1 to 4. Incidentally, arrows FR appropriately shown in these drawings show a vehicle forward side, and arrows UP show a vehicle upward side, and arrows IN show an inward side in the vehicle width direction.

Figure 1:
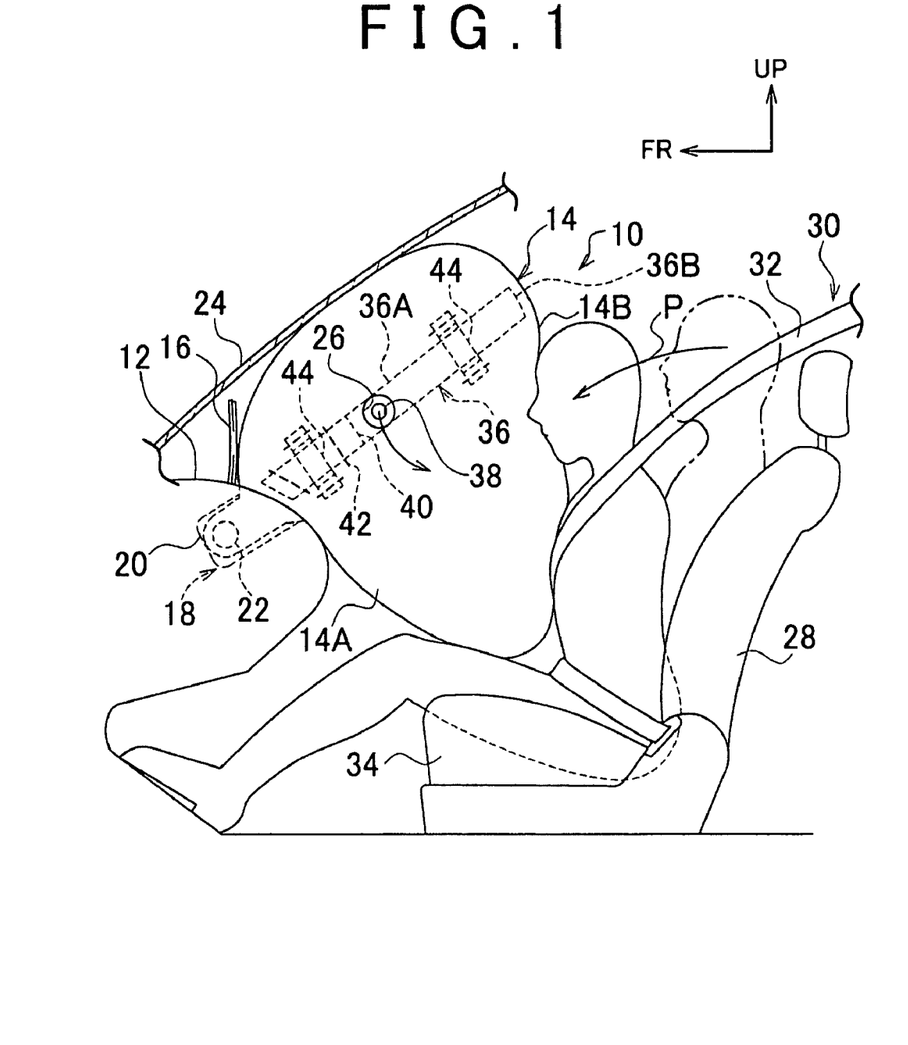
FIG. 1 is a side view showing a state in which a passenger seat airbag device in accordance with a first embodiment of the invention has activated and has inflated and deployed a passenger seat airbag to an occupant that is wearing webbing.
Figure 2A:
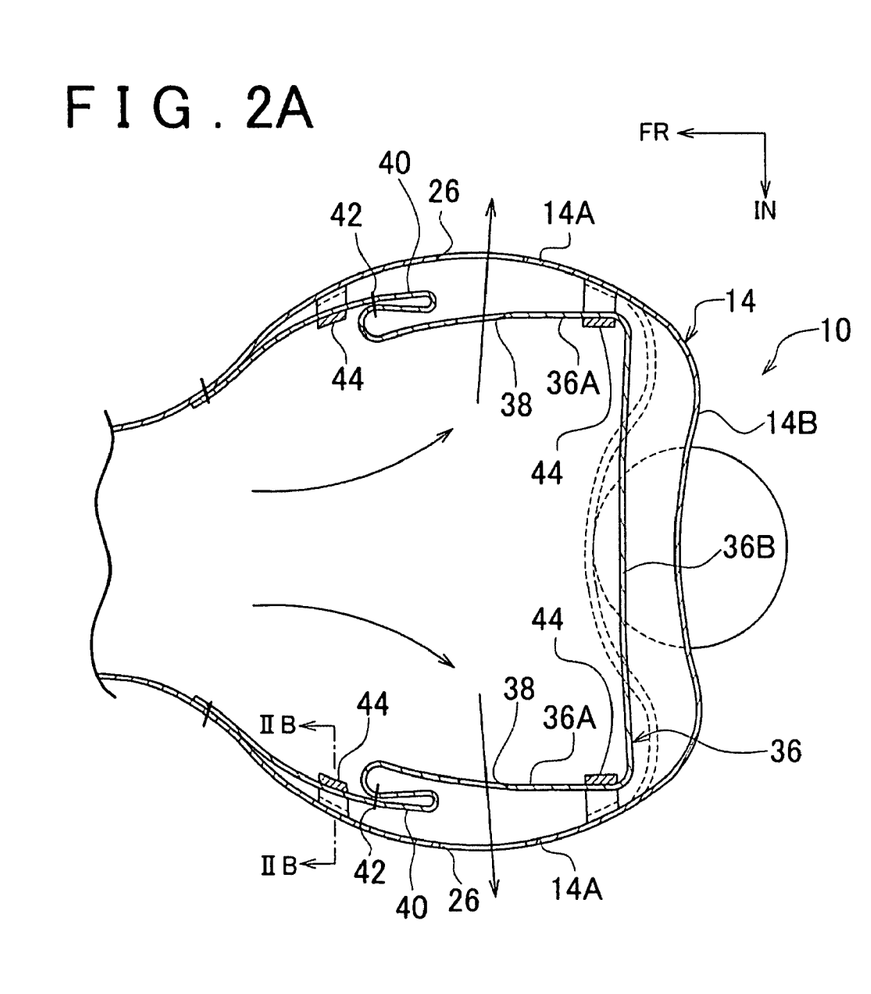
FIG. 2A is a horizontal sectional view of the passenger seat airbag shown in FIG. 1.
Figure 3:
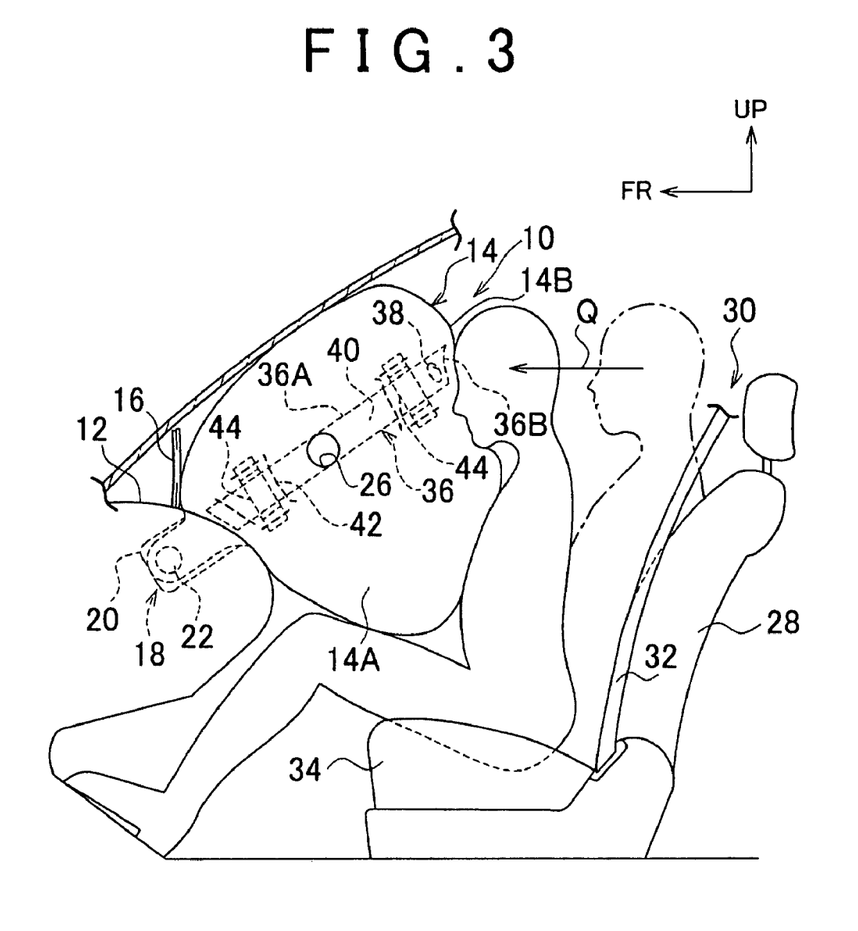
FIG. 3 is a side view showing a state in which the passenger seat airbag device in accordance with the first embodiment has activated, and has inflated and deployed the passenger seat airbag to an occupant that is not wearing webbing.
Figure 4:
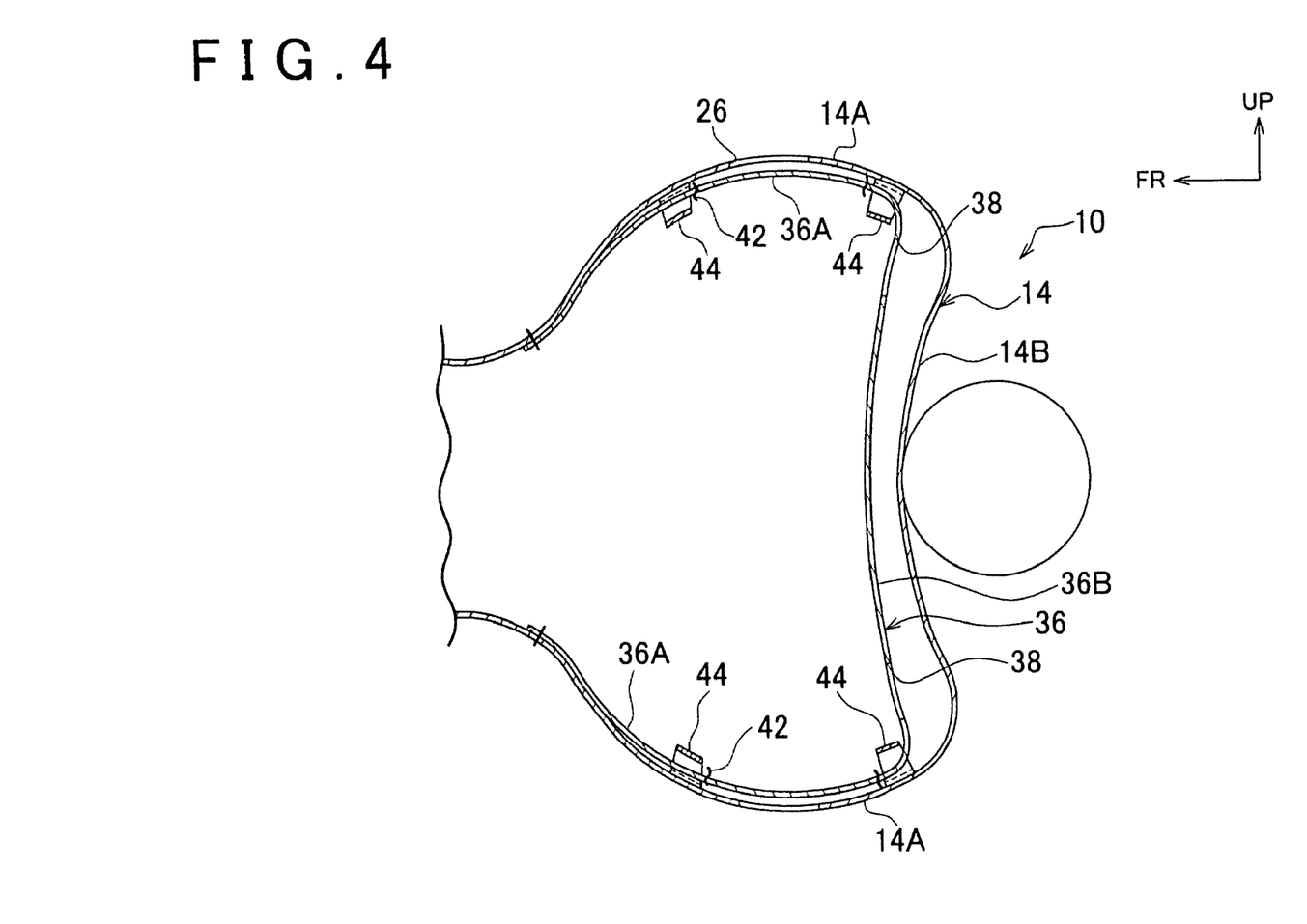
FIG. 4 is a horizontal sectional view of the passenger seat airbag shown in FIG. 3.

FIG. 1 shows a side view illustrating a state in which a passenger seat airbag device in accordance with the embodiment has activated, and has inflated and deployed a passenger seat airbag to an occupant that is wearing webbing. Besides, FIG. 2A shows a horizontal sectional view of the passenger seat airbag. Furthermore, FIG. 3 shows a side view illustrating a state in which the passenger seat airbag device in accordance with the embodiment has activated, and has inflated and deployed the passenger seat airbag to an occupant that is not wearing webbing. Besides, FIG. 4 shows a horizontal sectional view of the passenger seat airbag.

As shown in these drawings, the passenger seat airbag device 10 is disposed on a passenger seat-side portion of a top portion of an instrument panel 12. The passenger seat airbag device 10 is constructed of an airbag door 16 disposed in a passenger seat-side top portion of the instrument panel 12, and an airbag module 18 disposed at a position that is downwardly of the airbag door 16.

The airbag module 18 is constructed mainly of a module case 20 supported by an instrument panel reinforcement via a bracket, a generally cylindrical inflator 22 as a gas generation portion that is contained in the module case 20, and a passenger seat airbag 14 that is housed in folded state within the module case 20. The module case 20 is formed in a generally box shape, and is disposed so that an opening surface thereof faces a top portion of the instrument panel 12. The airbag door 16 is disposed so that the airbag door 16 can close the opening surface of the module case 20, and so that the airbag door 16 is deployed toward a windshield pane 24 about a hinge as the instrument panel 12 ruptures along a tear line (rupture portion) (not shown). In addition, whether the airbag door 16 is constructed as a single door or a double door is arbitrarily determined.

The inflator 22 is formed in a generally cylindrical shape, and is fixed to a bottom portion of the module case 20 with stud bolts and nuts. Although this inflator 22 is formed in a generally cylindrical shape, it is also permissible to use a so-called disc type inflator that is formed in a generally circular plate shape. Besides, the inflator 22 is of a type in which an interior is filled with a gas generation agent, and an ignition device (not shown) is electrified to burn the gas generation agent and therefore generate a large amount of gas. However, the inflator is not limited to this type, but it is also permissible to use a type of inflator that contains a high-pressure gas.

The passenger seat airbag 14 is housed in a folded state within a space above the inflator inside the module case 20. Besides, an opening portion for inserting the inflator 22 is formed at a base end side of the passenger seat airbag 14. Through the opening portion, the inflator 22 is inserted into the passenger seat airbag 14 in the folded state. The inflator 22 is fixed to a bottom portion of the module case 20 by inserting stud bolts that stand from the inflator 22 into an opening peripheral edge portion of the passenger seat airbag 14, and screwing nuts thereto from outside the bottom portion of the module case 20. Furthermore, a pair of left and right vent holes 26 for letting out gas from inside the passenger seat airbag 14 are formed in two side portions 14A of the passenger seat airbag 14.

On the other hand, the passenger seat (vehicle seat) 28 is provided with a passenger seat three-point seatbelt device 30. The seatbelt device 30 is constructed of a webbing 32 for restraining an occupant, a webbing winding device (not shown) that winds up an end of the webbing 32 into a layered state, an anchor plate (not shown) that supports another end of the webbing 32 on an outer side of a seat cushion 34 of the passenger seat 28 that is located outward in the vehicle width direction, a shoulder anchor (not shown) which is disposed in an upper portion of a center pillar and through which an intermediate portion of the webbing 32 is passed, a tongue plate (not shown) through which an intermediate portion of the webbing 32 is passed, and a buckle device (not shown) which stands at an inner side of the seat cushion 34 of the passenger seat 28 that is located inward in the vehicle width direction and with which the tongue plate is engaged.

Next, portions of the passenger seat airbag device 10 in accordance with the embodiment will be described.

Figure 2B:
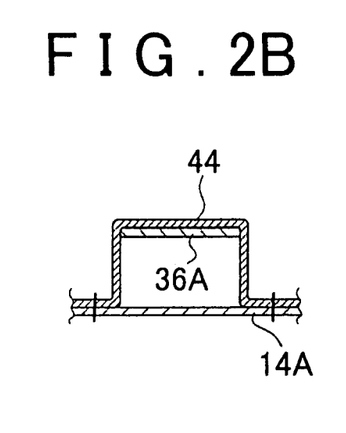
FIG. 2B is an enlarged sectional view taken on a line IIB-IIB in FIG. 2A.

As shown in FIGS. 1, 2A and 2B, a tether 36 is disposed in the foregoing passenger seat airbag 14. The tether 36 is formed in a band shape, and two end portions thereof are fixed by sewing to airbag module 18-side portions of the two side portions 14A of the passenger seat airbag 14. Incidentally, the fixing method for the tether 36 is not limited so. For example, it is also permissible to extend the two end portions of the tether 36 to the module case 20 side and fixed the extended two end portions to two side portions of the module case 20, or it is also permissible to further extend the two end portions of the tether 36 and fix the extended two end portions to a bottom portion of the module case 20 together with the inflator 22 by fastening them together.

The tether 36 is formed in a generally squared U shape in a plan view as shown in FIG. 2A, and is constructed of a pair of left and right side portions 36A, and an intermediate portion 36B that connects occupant-side end portions of the two side portions 36A in a bag transverse direction. The intermediate portion 36B of the tether 36 is disposed facing an occupant-side end portion 14B of the passenger seat airbag 14. That is, the intermediate portion 36B of the tether 36 is spaced from the occupant-side end portion 14B of the passenger seat airbag 14 by a predetermined distance forward relative to the vehicle. Besides, in a side view of the tether 36 in the inflated and deployed passenger seat airbag 14 as shown in FIG. 1, the tether 36 is disposed so that front ends of the side portions 36A in the lengthwise direction of the side portions 36A are located lower than rear ends thereof, and the tether 36 is disposed in an upper portion of the passenger seat airbag 14, and extends from the inflator 22 rearward and obliquely upward relative to the vehicle (substantially in parallel with the windshield pane 24), passing by or across the vent holes 26. In other words, the layout direction of the tether 36 is set so that the pair of left and right side portions 36A overlap with the pair of left and right vent holes 26.

Besides, the pair of left and right side portions 36A of the tether 36 are respectively provided with subsidiary vent holes 38 that are smaller in diameter than the vent holes 26. As shown in FIGS. 1 and 2A, a portion of each of the two side portions 36A located at positions between the inflator 22 and the vent holes 26 is provided with a surplus length portion (slack portion) 40 so that the subsidiary vent holes 38 are overlapped with the vent holes 26 when the tether 36 is laid out on the internal side surface of the passenger seat airbag 14. The surplus length portions 40 are each formed by picking up a predetermined length of a side portion 36A and sewing it up by a tear seam 42. Incidentally, the tear seams 42 are set so as to rupture when a tension of a predetermined value or greater acts in the lengthwise direction of the side portions 36A.

Furthermore, the two side portions 36A of the tether 36 are retained by a plurality of guides 44 that are provided as guide portions at a plurality of sites along a lay-out path of the tether 36. The guides 44 includes front guides 44 as front guide portions and rear guides 44 as rear guide portions. In a side view of the tether 36 in the inflated and deployed passenger seat airbag 14, the rear guides 44 need to be provided at least at sites at which the lay-out direction is changed, such as sites on the two side portions 14A of the passenger seat airbag 14 that are located at rear and upper portions and that are the starting points of the intermediate portion 36B. It is preferable that the front guides 44 be further provided at the position of the two side portion 14A in a position anterior to the surplus length portions 40.

As shown in FIG. 2B (a sectional view taken on the line IIB-IIB), the guides 44 are constructed by cutting the same cloth material as that of the passenger seat airbag 14 into short band-shape pieces, and sewing two end portions of the cut cloth pieces to the two side portions 14A of the passenger seat airbag 14 at least at upper and lower two sites. Incidentally, in this embodiment, the two end portions of each guide 44 are folded back in directions opposite to each other and are sewed to the two side portions 14A of the passenger seat airbag 14 so as to minimize the sliding resistance that occurs when the side portions 36A of the tether 36 move in the lengthwise direction of the side portions 36A. However, the two end portions may be folded back in the same direction, and then may be sewed to the guides 44. Or, the two end portions may be folded back in such directions as to approach each other. The side portions 36A of the tether 36 movably pass through the inside spaces of the guides 44 in the lengthwise direction of the side portions 36A.

Operation and Effects of the Embodiment

Next, operation and effects of the embodiment will be described.

Firstly, a description will be given in conjunction with an occupant wearing the webbing 32 of the seatbelt device 30 with reference to FIGS. 1 and 2B.

During an ordinary state, the passenger seat airbag device 10 does not activate, and the passenger seat airbag 14 is housed in the folded state within the module case 20.

Then, at the time of a frontal collision, a frontal collision state is detected by an airbag sensor (not shown), and a collision signal is input to the airbag ECU. The airbag ECU determines whether or not to activate the passenger seat airbag device 10 on the basis of the input signal. If an "airbag activation" determination is made, the airbag ECU electrifies the inflator 22 with a predetermined current. Therefore, the inflator 22 activates to generate gas. Supplied with this gas, the passenger seat airbag 14 having been housed in the folded state inflates. As the airbag internal pressure that acts on the airbag door 16 rises, the passenger seat airbag 14 ruptures the instrument panel 12 along the tear line, and deploys the airbag door 16. In consequence, the passenger seat airbag 14 is deployed toward an occupant sitting in the passenger seat 28 as shown in FIG. 1.

In the case of an occupant wearing the webbing 32, since the webbing 32 restrains the occupant's upper body that includes the head, the amount of inertia movement of the occupant's head in a forward direction of the vehicle is restricted, and the movement locus thereof is caused to be a locus that extends forward and obliquely downward relative to the vehicle (in the direction of an arrow P in FIG. 1). Therefore, the amount of advancement of the occupant's head into the passenger seat airbag 14 is caused to be relatively small as shown in FIGS. 1 and 2A. Hence, the pressing force that acts on the intermediate portion 36B of the tether 36 disposed in the passenger seat airbag 14 becomes less than a predetermined value (including the case where the intermediate portion 36B of the tether 36 is not pressed at all), and does not reach the rupture load of the tear seams 42 of the surplus length portions 40. Hence, the surplus length portions 40 are not elongated but remain as they are, maintaining a state in which the subsidiary vent holes 38 are overlapped with the vent holes 26 in a side view, that is, an open state of the vent holes 26 is maintained. Therefore, the gas in the passenger seat airbag 14 is let out through the vent holes 26, so that the internal pressure of the passenger seat airbag 14 is appropriately kept. Besides, since the intermediate portion 36B of the tether 36 is spaced from the occupant-side end portion 14B of the passenger seat airbag 14 by a predetermined distance forward relative to the vehicle, the force applied to the intermediate portion 36B from the head of the occupant, who is wearing the webbing 32, becomes even smaller, so that the rupture of the tear seams 42 provided on the surplus length portions 40 can be substantially avoided. Besides, in a side view of the tether 36 in the inflated and deployed passenger seat airbag 14, the guides 44 are set at least at sites on the two side portions 14A of the passenger seat airbag 14 that are located at rear and upper portions and that are the starting points of the intermediate portion 36B, and therefore the intermediate portion 36B is off the movement locus of the occupant's head. Hence, the transmission of force from the occupant's head to the intermediate portion 36B can be substantially avoided.

Next, operation and effects of the embodiment will be described in conjunction with an occupant that is not wearing the webbing 32 of the seatbelt device 30, with reference to FIGS. 3 and 4.

In the case of an occupant not wearing the webbing 32, since the webbing 32 does not restrain the inertia movement of the occupant's upper body that includes the head to the vehicle forward side, the occupant's head moves forward relative to the vehicle (in the direction of an arrow Q in FIG. 3) by inertia at the time of a frontal collision or the like. Therefore, the amount of advancement of the occupant's head into the passenger seat airbag 14 becomes larger, the intermediate portion 36B whose two ends are retained by the guides 44 provided at the sites on the two side portions 14A of the passenger seat airbag 14 that are located at rear and upper portions relative to the vehicle are present on the movement locus of the occupant's head, so that the pressing force (tension) that acts on the intermediate portion 36B of the tether 36 disposed within the passenger seat airbag 14 becomes greater than or equal to the predetermined value. Therefore, the load that acts on the tear seams 42 of the surplus length portions 40 reaches the rupture load, so that the tear seams 42 rupture. As a result, the surplus length portions 40 is elongated, so that the pair of left and right side portions 36A of the tether 36 are drawn to the intermediate portion 36B side (the subsidiary vent holes 38 moves rearward in the lengthwise direction of the tether 36). In consequence, the subsidiary vent holes 38 move to positions at which the subsidiary vent holes 38 do not overlap with the vent holes 26, thus closing the vent holes 26 of the passenger seat airbag 14. Therefore, the internal pressure of the passenger seat airbag 14 is maintained at a high level, thus appropriately restraining the occupant's upper body that includes the head.

Furthermore, in this embodiment, if the vehicle undergoes an obliquely front side collision in the case where an occupant is not wearing the webbing 32, the movement locus of the occupant's head is caused to be a locus extending obliquely forward relative to the vehicle as well. However, since the pair of left and right side portions 36A of the tether 36 extend along the internal side surfaces of the two side portions 14A of the passenger seat airbag 14 and since the intermediate portion 36B thereof connects the occupant-side end portions of the pair of left and right side portions 36A in the airbag transverse direction, and is disposed facing the occupant-side end portion 14B of the passenger seat airbag 14, the pressing force by the occupant's head acts on a site in the intermediate portion 36B of the tether 36 extending in the vehicle width direction even when the inertia movement direction of the occupant's head deviates from a forward direction to an obliquely forward direction relative to the vehicle. Therefore, in the case of an oblique collision, too, the pair of left and right side portions 36A of the tether 36 move relative to the internal side surfaces of the two side portions 14A of the passenger seat airbag 14, so that the vent holes 26 are closed.

Moreover, unlike the foregoing related technology, the construction of this embodiment is not a construction that closes a vent hole formed in the passenger seat airbag by using a member provided outside the airbag, but a construction in which the vent holes 26 are closed by using the tether 36 that is disposed within the passenger seat airbag 14. Therefore, this embodiment is not subject to an external factor, such as a surrounding configuration or the like, for example, the shape of the windshield pane 24 or the like.

The foregoing description can be summarized as follows. In the passenger seat airbag device 10 in which the vent holes 26 are opened and closed by using the tether 36 in accordance with this embodiment, the opening and closing of the vent holes 26 can be appropriately controlled even if the colliding direction of an occupant to the passenger seat airbag 14 deviates from a forward direction to an oblique direction relative to the vehicle.

Besides, since this embodiment is constructed so that the opening and closing of the vent holes 26 of the passenger seat airbag 14 is controlled through movement of the tether 36 in its lengthwise direction and so that the movement of the tether 36 in the lengthwise direction is guided by the guides 44, the opening and closing control of the vent holes 26 is accurately performed in this embodiment, as compared with a structure that is not provided with any guide portion. In consequence, according to this embodiment, the precision of the opening and closing control of the vent holes 26 can be raised (reliability can be improved).

Second Embodiment

Next, a second embodiment of the vehicle airbag device in accordance with the invention will be described with reference to FIGS. 5 to 7. Incidentally, the same component portions and the like as those of the first embodiment will be given the same reference characters, and descriptions thereof will be omitted below.

Figure 5:
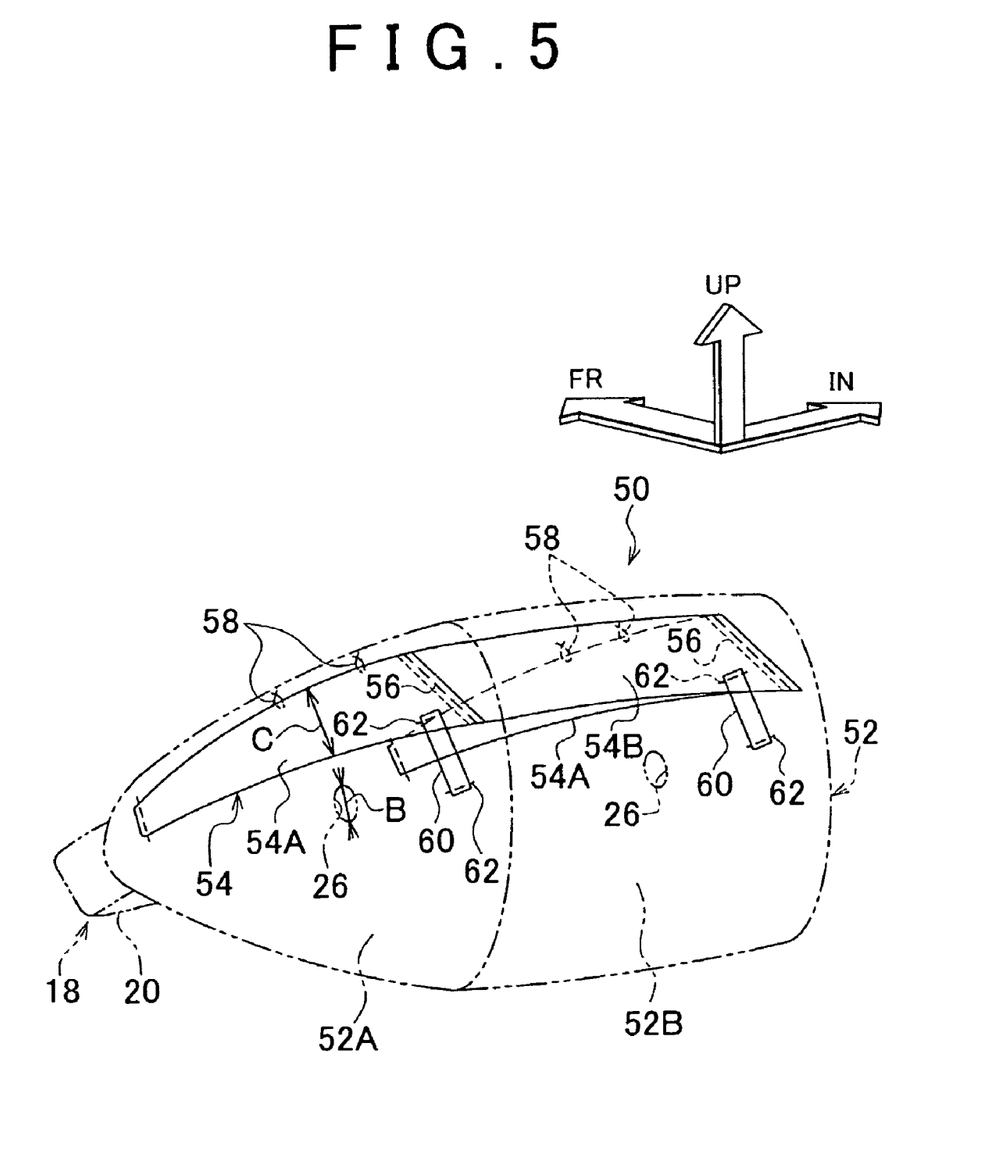
FIG. 5 is a perspective view showing centrally a tether that is a portion of a passenger seat airbag device in accordance with a second embodiment.

As shown in FIG. 5, in a passenger seat airbag device 50 in accordance with the second embodiment, a tether 54 formed in a squared U shape in a plan view is disposed within a passenger seat airbag 52. Concretely, the tether 54 is constructed of a pair of left and right side portions 54A extending along internal side surfaces of two side portions 52A of the passenger seat airbag 52, and an intermediate portion 54B connecting occupant-side end portions of these two side portions 54A.

Base end portions of the pair of left and right side portions 54A are fixed by sewing near end portions of the two side portions 52A of the passenger seat airbag 52 that are opposite to the occupant side. However, the base end portions of the two side portions 54A may also be fixed to the module case 20 side instead, as in the foregoing first embodiment. Besides, the dimension of the side portions 54A in the height direction is set so as to become gradually larger from the base end portions near an airbag module 18 toward occupant-side end portions, and the height-direction dimension C (see FIG. 5) of portions of the side portions 54A that are located above vent holes 26 formed in the two side portions 52A of the passenger seat airbag 52 is set larger than an inside diameter B of the vent holes 26. Besides, the occupant-side end portions of the side portions 54A are inclined so that upper portions thereof are located in front of lower portions thereof relative to the vehicle in a side view. Corresponding to this, the intermediate portion 54B is inclined so that its upper edge is located in front of its lower edge relatively to vehicle in a side view, and is formed in a uniform-height band shape whose dimension in the height direction is equal to the length of inclined sides of the occupant-side end portions of the side portions 54A which are inclined forward. Two end portions of the intermediate portion 54B in its lengthwise direction are folded forward relative to the vehicle to form seam allowances, and sewed to the occupant-side end portions of the side portions 54A with thread 56. In this manner, the intermediate portion 54B and the side portions 54A are interlinked. That is, the tether 54 is constructed by sewing a total of three cloth members, that is, the pair of left and right side portions 54A and the intermediate portion 54B. Besides, the dimension of the side portions 54A in their lengthwise direction is set at such a length that the intermediate portion 54B inclined forward relative to the vehicle faces an occupant when the passenger seat airbag 52 is inflated and deployed.

The two side portions 54A of the tether 54 are disposed upwardly of the vent holes 26 formed in the two side portions 52A of the passenger seat airbag 52, and are retained at predetermined positions in the passenger seat airbag 52 by temporal stopper portions 58 that are set at a plurality of sites on the upper edges of the side portions 54A. Specifically, the temporal stopper portions 58 are set at about two sites on the upper edge of each side portion 54A that are located forward and rearward of the vent hole 26, sandwiching the vent hole 26. The temporal stopper portions 58 are designed so as to rupture when receiving a load that is greater than or equal to a predetermined value. The temporal stopper portions 58 retain the tether 54 in a suspended state at an upwardly shifted location so that the side portions 54A of the tether 54 do not overlap with the vent holes 26, and also retain the tether 54 so that the intermediate portion 54B thereof is disposed on the movement locus of the head of an occupant that is not wearing a webbing 32 when the passenger seat airbag 52 is inflated and deployed.

Furthermore, band-shape stoppers 60 formed of the same material as the passenger seat airbag 52 are attached by sewing to portions of the lower edges of the side portions 54A that are near the intermediate portion 54B. Upper end portions of the stoppers 60 are sewed, with a thread 62, to sites on the lower edge side of the side portions 54A that are near the intermediate portion 54B. Lower end portions of the stoppers 60 are sewed to the two side portions 52A of the passenger seat airbag 52 with the thread 62. The length of the stoppers 60 is set at such a length as to be able to restrict the side portions 54A from being displaced downward beyond a position at which the side portions 54A cover the vent holes 26, when the tether 54 is forced downward relative to the vehicle.

Besides, the intermediate portion 54B of the tether 54 is spaced from the occupant-side end portion 52B of the passenger seat airbag 52 by a predetermined distance forward relative to the vehicle.

(Operation and Effects)

Figure 6:
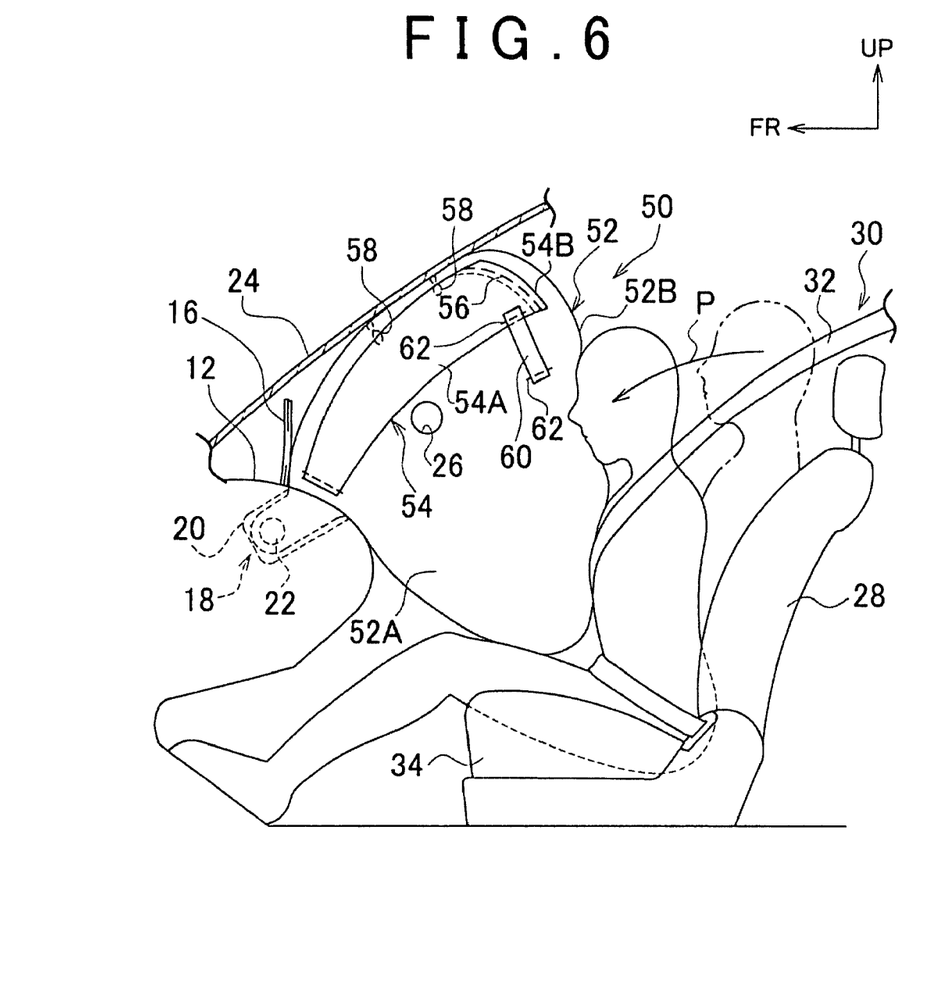
FIG. 6 is a side view corresponding to FIG. 1 that shows a state in which the passenger seat airbag device in accordance with the second embodiment has activated, and has inflated and deployed a passenger seat airbag to an occupant that is wearing webbing.

According to the foregoing construction, in the case of an occupant wearing the webbing 32 as shown in FIG. 6, since the webbing 32 restrains the occupant's upper body that includes the head, the amount of the inertia movement of the occupant's head in a forward direction of the vehicle is restricted, and the movement locus thereof is caused to be a locus that extends forward and obliquely downward relative to the vehicle (in the direction of an arrow P in FIG. 6). Therefore, the intermediate portion 54B of the tether 54 does not come onto the movement locus of the occupant's head, and the amount of advancement of the occupant's head into the passenger seat airbag 52 is caused to be relatively small. Hence, the pressing force that acts on the intermediate portion 54B of the tether 54 disposed in the passenger seat airbag 52 becomes less than a predetermined value (including the case where the intermediate portion 54B of the tether 54 is not pressed at all), and the load that acts on the temporal stopper portions 58 does not reach the rupture load. Consequently, the side portions 54A of the tether 54 are retained above the vent holes 26, and the open state of the vent holes 26 is maintained. Hence, the gas in the passenger seat airbag 52 is let out through the vent holes 26, so that the internal pressure of the passenger seat airbag 52 is appropriately kept. Besides, since the intermediate portion 54B of the tether 54 is spaced from the occupant-side end portion 52B of the passenger seat airbag 52 by a predetermined distance forward relative to the vehicle, the force applied to the intermediate portion 54B from the head of the occupant, who is wearing the webbing 32, becomes even smaller, so that the rupture of the temporal stopper portions 58 can be substantially avoided.

Figure 7:
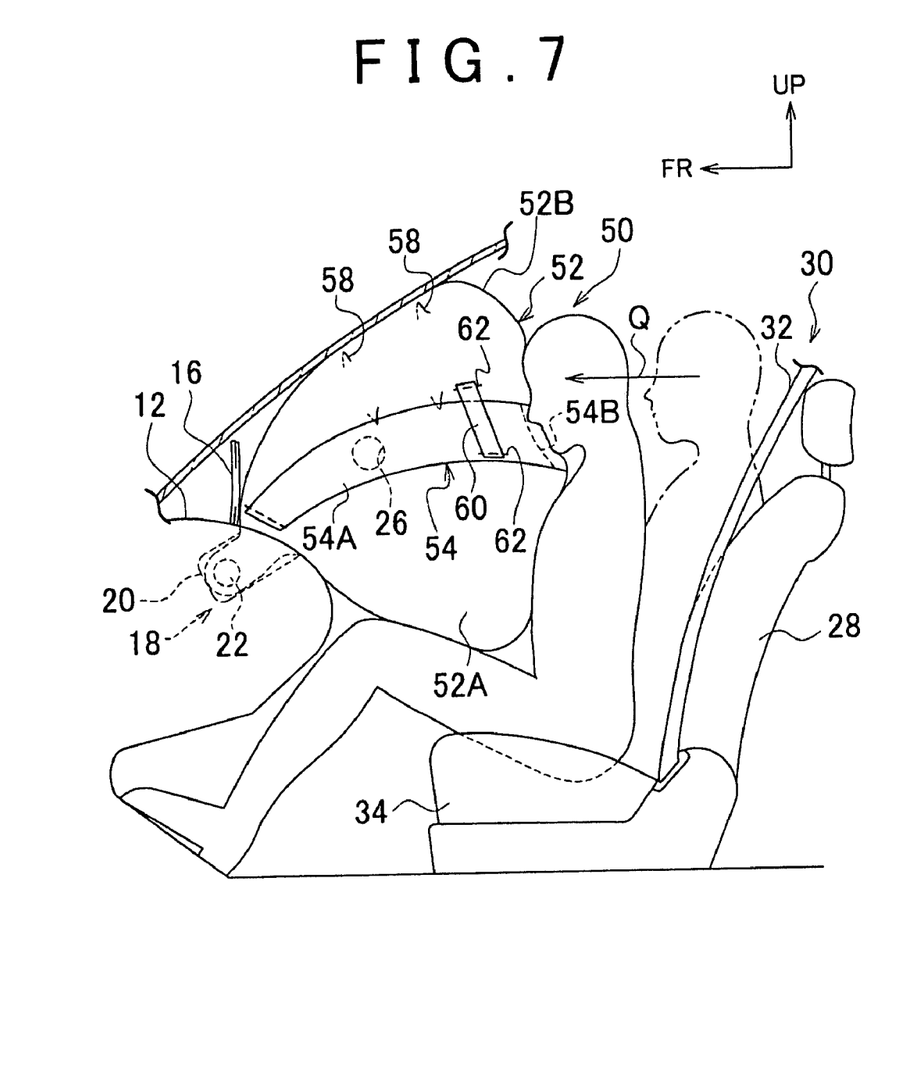
FIG. 7 is a side view corresponding to FIG. 3 that shows a state in which the passenger seat airbag device in accordance with the second embodiment has activated, and has inflated and deployed the passenger seat airbag to an occupant that is not wearing webbing.

On the other hand, in the case of an occupant not wearing the webbing 32 as shown in FIG. 7, since the webbing 32 does not restrain the inertia movement of the occupant's upper body that includes the head in a forward direction of the vehicle, the occupant's head moves forward relative to the vehicle (in the direction of an arrow Q in FIG. 7) by inertia at the time of a frontal collision or the like. Therefore, the amount of advancement of the occupant's head into the passenger seat airbag 52 becomes large, so that the intermediate portion 54B of the tether 54 that is disposed in the passenger seat airbag 52 and that is positioned in the movement locus of the occupant's head is strongly pressed.

Since the intermediate portion 54B is disposed in such a forwardly inclined state that its upper edge is located in front of its lower edge in the longitudinal direction of the vehicle, the pressing force that presses the intermediate portion 54B forward relative to the vehicle is transformed into a component force acting forward relative to the vehicle and a component force acting downward relative to the vehicle. The component force in a downward direction of the vehicle acts as a tensile load by which the temporal stopper portions 58 that temporarily stop the upper edges of the side portions 54A to the predetermined positions in the passenger seat airbag 52 is pulled downward relative to the vehicle. When this tensile load reaches the rupture load of the temporal stopper portions 58, the temporal stopper portions 58 rupture. Therefore, the pair of left and right side portions 54A are pressed downward relative to the vehicle (the whole tether 54 is pivoted downward relative to the vehicle about the base end portion opposite to the occupant side) until the downward displacement is restricted by the stoppers 60. As a result, the vent holes 26 are closed by the pair of left and right side portions 54A. Hence, the internal pressure of the passenger seat airbag 52 is maintained at a high level, so that the occupant's upper body that includes the head is appropriately restrained.

Furthermore, in this embodiment, similarly to the first embodiment, if the vehicle receives an impact from obliquely forward of the vehicle in the case where an occupant is not wearing the webbing 32, the movement locus of the occupant's head also goes obliquely forward relative to the vehicle. However, since the pair of left and right side portions 54A of the tether 54 extend along the internal side surfaces of the two side portions 52A of the passenger seat airbag 52 and since the intermediate portion 54B of the tether 54 interconnects the occupant-side end portions of the pair of left and right side portions 54A in the airbag transverse direction, and is disposed facing the occupant-side end portion 52B of the passenger seat airbag 52, the pressing force by the occupant's head acts on a site in the intermediate portion 54B of the tether 54 extending in the vehicle width direction even when the inertia movement direction of the occupant's head deviates from a forward direction to an obliquely forward direction relative to the vehicle. Hence, in the case of an oblique collision, too, the temporal stopper portions 58 are ruptured, and the pivot action of the tether 54 in a downward direction of the vehicle is performed, so that the pair of left and right side portions 54A close the vent holes 26. Besides, since the sewing positions of the temporal stopper portions 58 are the upper edges of the side portions 54A of the tether 54, a component force downward relative to the vehicle that is transformed from the pressing force that presses the intermediate portion 54B of the tether 54 forward relative to the vehicle acts immediately as a tensile load that pulls the temporal stopper portions 58 downward relative to the vehicle.

Moreover, unlike the foregoing related technology, the construction of this embodiment is not a construction that closes a vent hole formed in the passenger seat airbag by using a member provided outside the airbag, but a construction in which the vent holes 26 are closed by using the tether 54 that is disposed within the passenger seat airbag 52. Therefore, this embodiment is not subject to an external factor, such as a surrounding configuration or the like, for example, the shape of the windshield pane 24 or the like.

The foregoing description can be summarized as follows. In the passenger seat airbag device 50 in which the vent holes 26 are opened and closed by using the tether 54 in accordance with this embodiment, the opening and closing of the vent holes 26 can be appropriately controlled even if the colliding direction of an occupant to the passenger seat airbag 52 deviates from a forward direction to an oblique direction relative to the vehicle.

Besides, in this embodiment, the height-direction dimension C of portions of the pair of left and right side portions 54A of the tether 54 that are located upwardly of the vent holes 26 is set larger than the radial dimension B of the vent holes 26, and the tether 54 is displaced downward relative to the vehicle to close the vent holes 26 by a pressing force in a downward direction of the vehicle which is transformed from the pressing force that acts on the intermediate portion 54B of the tether 54 in a forward direction of the vehicle through the use of the intermediate portion 54B that is an inclined portion. Therefore, there is no need for any special contrivance on the tether 54, except for the construction in which the intermediate portion 54B is disposed in a forwardly inclined state in which the upper edge of the intermediate portion 54B is positioned in front of the lower edge thereof in the longitudinal direction of the vehicle. Therefore, the manufacture precision requirements of the tether 54 can be relaxed to reduce the cost.

Supplementary Description of the Foregoing Embodiments

Although in the foregoing embodiments, the invention is applied o the passenger seat airbag devices 10, 50, this is not restrictive. For example, the invention may also be applied to a driver's seat airbag device for a next generation-type vehicle that is capable of being operated through the use of a steering device in place of the steering wheel.

Besides, although in the foregoing embodiments the passenger seat airbag devices 10, 50 are constructed so as to activate at the time of a frontal collision, this is not restrictive. For example, the invention may also be applied to a passenger seat airbag device that is activated when a frontal collision is predicted by a frontal collision prediction sensor such as a pre-crash sensor or the like.

Besides, in the foregoing first embodiment, the intermediate portion 36B of the tether 36 is spaced from the occupant-side end portion 14B of the passenger seat airbag 14 by a predetermined distance forward relative to the vehicle, and in the second embodiment, the intermediate portion 54B of the tether 54 is spaced from the occupant-side end portion 52B of the passenger seat airbag 52 by a predetermined distance forward relative to the vehicle. However, the intermediate portion 36B or the intermediate portion 54B may also be disposed at such a distance from the occupant-side end portion of the passenger seat airbag as to substantially contact the occupant-side end portion of the passenger seat airbag. In this case, it suffices that, in consideration of the force that is slightly transmitted from the head of an occupant wearing the webbing 32 to the intermediate portion 36B or the intermediate portion 54B, the sewing strength of the tear seams 42 or the temporal stopper portions 58 be set high so that the tear seams 42 or the temporal stopper portions 58 will not be ruptured by the force that is transmitted thereto from the head of the occupant wearing the webbing 32 via the airbag.

Furthermore, although in the second embodiment the stoppers 60 are set, the stoppers 60 may be omitted in the case where the dimension C of the pair of left and right side portions 54A in the height direction thereof can be set sufficiently large relative to the dimension B of the vent holes 26 in a radial direction. That is, in the case where the height-direction dimension C of the side portions 54A can be set by taking into account the variation of the amount of downward displacement of the side portions 54A, the vent holes 26 can be closed even if the stoppers 60 are omitted.

Furthermore, although in the second embodiment the whole intermediate portion 54B of the tether 54 is an inclined portion, this is not restrictive. For example, it is also permissible to adopt, for example, a construction in which an upper portion of approximately two thirds of the intermediate portion of the tether is an inclined portion, and the lower one-third portion is substantially parallel to the occupant-side end portion 52B of the passenger seat airbag 52.

What is claimed is:

1. A vehicle airbag device comprising:
a gas generation portion that generates gas when activated;
an airbag which is housed in a folded state when the gas generation portion is not activated, and which inflates and deploys by receiving supply of a gas when the gas generation portion is activated, and whose two side portions are provided with vent holes for letting out the gas;
a tether that includes pair of left and right side portions whose base end portions are fixed to a gas generation portion-side site or a site on a side of the airbag opposite to an occupant side, and which extend along internal side surfaces of the two side portions of the airbag, and an intermediate portion that interconnects occupant-side end portions of the pair of left and right side portions in an airbag transverse direction and that is disposed apart by a predetermined distance from and facing an occupant-side end portion of the airbag; and a vent hole opening-closing control portion that maintains an open state of the vent holes when a pressing force that acts on the intermediate portion of the tether is less than a predetermined value, and that closes the vent holes by moving the pair of left and right side portions relative to the internal side surfaces of the two side portions of the airbag when the pressing force on the intermediate portion of the tether is greater than or equal to the predetermined value.

2. The vehicle airbag device according to claim 1, wherein the vent hole opening-closing control portion includes:

subsidiary vent holes that are formed respectively at positions in the pair of left and right side portions at which the subsidiary vent holes overlap with the vent holes;

surplus length portions which are provided at sites on the pair of left and right side portions of the tether, which are at a position between the gas generation portion and the subsidiary vent holes and which elongate the side portions so that the subsidiary vent holes are offset from the vent holes when a tear seam is ruptured by action of a load equal to or greater than a predetermined value; and a guide portion that retains the pair of left and right side portions so that the subsidiary vent holes overlap with the vent holes, and that guides a movement of the tether in a lengthwise direction of the tether if the tear seam is ruptured by the pressing force greater than or equal to the predetermined value acting on the intermediate portion.

3. The vehicle airbag device according to claim 1, wherein a height-direction dimension of portions of the pair of left and right side portions of the tether that are located above the vent holes is set larger than a radial dimension of the vent holes, and the vent hole opening-closing control portion includes a temporal stopper portion that retains the pair of left and right side portions of the tether at a position above the vent holes, and that is ruptured by the pressing force equal to or greater than the predetermined value acting on the intermediate portion of the tether, and an inclined portion that is provided in the intermediate portion of the tether and is inclined forward in a side view of the airbag and that transforms a portion of a pressing force in a forward direction of the vehicle into a pressing force in a downward direction of the vehicle.

4. A vehicle airbag device comprising:

a gas generation portion that generates gas when activated;

an airbag which is housed in a folded state when the gas generation portion is not activated, and which inflates and deploys by receiving supply of a gas when the gas generation portion is activated, and whose two side portions are provided with vent holes for letting out the gas;

a tether that includes pair of left and right side portions whose base end portions are fixed to a gas generation portion-side site or a site on a side of the airbag opposite to an occupant side, and which extend along internal side surfaces of the two side portions of the airbag, and an intermediate portion that interconnects occupant-side end portions of the pair of left and right side portions in an airbag transverse direction; and a vent hole opening-closing control portion that maintains an open state of the vent holes when a pressing force that acts on the intermediate portion of the tether is less than a predetermined value, and that closes the vent holes by moving the pair of left and right side portions relative to the internal side surfaces of the two side portions of the airbag when the pressing force on the intermediate portion of the tether is greater than or equal to the predetermined value.

5. The vehicle airbag device according to claim 4, wherein the intermediate portion of the tether is disposed apart by a predetermined distance from and facing an occupant-side end portion of the airbag.

6. The vehicle airbag device according to claim 4, wherein the vent hole opening-closing control portion includes:

subsidiary vent holes that are formed respectively at positions in the pair of left and right side portions at which the subsidiary vent holes overlap with the vent holes;

surplus length portions which are provided at sites on the pair of left and right side portions of the tether, which are at a position between the gas generation portion and the subsidiary vent holes and which elongate the side portions so that the subsidiary vent holes are offset from the vent holes when a tear seam is ruptured by action of a load equal to or greater than a predetermined value; and a guide portion that retains the pair of left and right side portions so that the subsidiary vent holes overlap with the vent holes, and that guides a movement of the tether in a lengthwise direction of the tether if the tear seam is ruptured by the pressing force greater than or equal to the predetermined value acting on the intermediate portion.

7. The vehicle airbag device according to claim 6, wherein the guide portion includes a rear guide portion that is provided at a rear and upper site in the airbag in a side view of the airbag in a deployed state, and that retains a rear portion of the side portion.

8. The vehicle airbag device according to claim 7, wherein the guide portion includes a front guide portion that is provided at a site anterior to the surplus length portion in the airbag in a side view of the airbag in a deployed state, and that retains a front portion of the side portion.

9. The vehicle airbag device according to claim 4, wherein a height-direction dimension of portions of the pair of left and right side portions of the tether that are located above the vent holes is set larger than an opening dimension of the vent holes, and the vent hole opening-closing control portion includes a temporal stopper portion that retains the pair of left and right side portions of the tether at a position above the vent holes, and that is ruptured by the pressing force equal to or greater than the predetermined value acting on the intermediate portion of the tether, and an inclined portion that is provided in the intermediate portion of the tether and is inclined in a side view of the airbag so that an upper edge of the intermediate portion is located in front of a lower edge of the intermediate portion in a longitudinal direction of the vehicle, and that transforms a portion of a pressing force in a forward direction of the vehicle into a pressing force in a downward direction of the vehicle.

10. The vehicle airbag device according to claim 9, further comprising a stopper that defines a downward movement amount of the tether, wherein the stopper is set so as to move downward to a position at which the pair of left and right side portions overlap with the vent holes of the airbag when the temporal stopper portions rupture.

11. The vehicle airbag device according to claim 9, wherein the temporal stopper portions rupturably interlink the airbag and upper edges of the pair of left and right side portions.

12. A airbag body for a vehicle airbag device comprising:
an airbag which is housed in a folded state when a airbag device is not activated, and which inflates and deploys by receiving supply of a gas when the airbag device is activated, and whose two side portions are provided with vent holes for letting out the gas;
a tether that includes pair of left and right side portions whose base end portions are fixed to a gas generation portion-side site or a site on a side of the airbag opposite to an occupant side, and which extend along internal side surfaces of the two side portions of the airbag, and an intermediate portion that interconnects occupant-side end portions of the pair of left and right side portions in an airbag transverse direction; and
a vent hole opening-closing control portion that maintains an open state of the vent holes when a pressing force that acts on the intermediate portion of the tether is less than a predetermined value, and that closes the vent holes by moving the pair of left and right side portions relative to the internal side surfaces of the two side portions of the airbag when the pressing force on the intermediate portion of the tether is greater than or equal to the predetermined value.

13. The airbag body for the vehicle airbag device according to claim 12, wherein
the intermediate portion of the tether is disposed apart by a predetermined distance from and facing an occupant-side end portion of the airbag.

14. The airbag body for the vehicle airbag device according to claim 12, wherein
the vent hole opening-closing control portion includes:
subsidiary vent holes that are formed respectively at positions in the pair of left and right side portions at which the subsidiary vent holes overlap with the vent holes;
surplus length portions which are provided at sites on the pair of left and right side portions of the tether, which are at a position between the gas generation portion and the subsidiary vent holes and which elongate the side portions so that the subsidiary vent holes are offset from the vent holes when a tear seam is ruptured by action of a load equal to or greater than a predetermined value; and
a guide portion that retains the pair of left and right side portions so that the subsidiary vent holes overlap with the vent holes, and that guides a movement of the tether in a lengthwise direction of the tether if the tear seam is ruptured by the pressing force greater than or equal to the predetermined value acting on the intermediate portion.

15. The airbag body for the vehicle airbag device according to claim 14, wherein
the guide portion includes a rear guide portion that is provided at a rear and upper site in the airbag in a side view of the airbag in a deployed state, and that retains a rear portion of the side portion.

16. The airbag body for the vehicle airbag device according to claim 15, wherein
the guide portion includes a front guide portion that is provided at a site anterior to the surplus length portion in the airbag in a side view of the airbag in a deployed state, and that retains a front portion of the side portion.

17. The airbag body for the vehicle airbag device according to claim 12, wherein
a height-direction dimension of portions of the pair of left and right side portions of the tether that are located above the vent holes is set larger than an opening dimension of the vent holes, and the vent hole opening-closing control portion includes a temporal stopper portion that retains the pair of left and right side portions of the tether at a position above the vent holes, and that is ruptured by the pressing force equal to or greater than the predetermined value acting on the intermediate portion of the tether, and an inclined portion that is provided in the intermediate portion of the tether and is inclined in a side view of the airbag so that an upper edge of the intermediate portion is located in front of a lower edge of the intermediate portion in a longitudinal direction of the vehicle, and that transforms a portion of a pressing force in a forward direction of the vehicle into a pressing force in a downward direction of the vehicle.

18. The airbag body for the vehicle airbag device according to claim 17, further comprising
a stopper that defines a downward movement amount of the tether,
wherein the stopper is set so as to move downward to a position at which the pair of left and right side portions overlap with the vent holes of the airbag when the temporal stopper portions rupture.

19. The airbag body for the vehicle airbag device according to claim 17, wherein
the temporal stopper portions rupturably interlink the airbag and upper edges of the pair of left and right side portions.

* * * * *